United States Patent
Sudhakar

(10) Patent No.: US 7,949,670 B2
(45) Date of Patent: May 24, 2011

(54) LANGUAGE NEUTRAL TEXT VERIFICATION

(75) Inventor: Narayanamurthy Sudhakar, Hyderabad (IN)

(73) Assignee: Microsoft Corporation, Redmond, WA (US)

( * ) Notice: Subject to any disclaimer, the term of this patent is extended or adjusted under 35 U.S.C. 154(b) by 431 days.

(21) Appl. No.: 11/687,411

(22) Filed: Mar. 16, 2007

(65) Prior Publication Data

US 2008/0228466 A1 Sep. 18, 2008

(51) Int. Cl.
*G06F 7/00* (2006.01)
*G06F 17/30* (2006.01)

(52) U.S. Cl. .................. 707/761; 707/759; 707/760

(58) Field of Classification Search .......... 707/6, 759, 707/760, 761
See application file for complete search history.

(56) References Cited

U.S. PATENT DOCUMENTS

| | | | |
|---|---|---|---|
| 5,678,039 A * | 10/1997 | Hinks et al. ................ 707/4 |
| 5,960,382 A * | 9/1999 | Steiner ..................... 704/2 |
| 6,311,183 B1 | 10/2001 | Cohen |
| 6,327,561 B1 | 12/2001 | Smith et al. |
| 6,654,717 B2 | 11/2003 | Loofbourrow et al. |
| 6,681,217 B1 | 1/2004 | Lewak |
| 6,754,847 B2 * | 6/2004 | Dalal et al. ............... 714/27 |
| 7,010,546 B1 * | 3/2006 | Kolawa et al. ............. 707/694 |
| 7,050,822 B2 * | 5/2006 | Nielsen et al. ............. 455/466 |
| 7,093,231 B2 * | 8/2006 | Nuss ......................... 717/114 |
| 7,233,803 B2 * | 6/2007 | Nielsen et al. ............. 455/466 |
| 7,254,632 B2 * | 8/2007 | Zeira et al. ................ 709/224 |
| 7,315,867 B2 * | 1/2008 | Kobayashi et al. ........ 707/102 |
| 7,454,346 B1 * | 11/2008 | Dodrill et al. ............. 704/260 |
| 7,860,846 B2 * | 12/2010 | Takahashi et al. ......... 707/702 |
| 2002/0042794 A1 | 4/2002 | Konaka |
| 2003/0135445 A1 | 7/2003 | Herz et al. |
| 2003/0149562 A1 | 8/2003 | Walther |
| 2004/0264782 A1 | 12/2004 | McKnight et al. |
| 2005/0289182 A1 * | 12/2005 | Pandian et al. ............ 707/104.1 |
| 2006/0004826 A1 | 1/2006 | Zartler et al. |
| 2006/0064672 A1 | 3/2006 | Pandit et al. |
| 2006/0107228 A1 * | 5/2006 | Holzbauer et al. ......... 715/780 |
| 2006/0167873 A1 * | 7/2006 | Degenaro et al. ......... 707/6 |
| 2006/0179054 A1 * | 8/2006 | Levi .......................... 707/6 |
| 2006/0242180 A1 | 10/2006 | Graf et al. |
| 2007/0073544 A1 * | 3/2007 | Millett et al. ............. 704/277 |
| 2007/0101196 A1 * | 5/2007 | Rogers et al. ............. 714/38 |
| 2008/0082317 A1 * | 4/2008 | Rosart et al. .............. 704/8 |
| 2008/0126074 A1 * | 5/2008 | Whitelock et al. ......... 704/2 |

OTHER PUBLICATIONS

Ralf Steinberger et al. "Exploiting multilingual nomenclatures and language-independent text features as an interlingua for cross-lingual text analysis applications", Information Society 2004 (IS-2004)—Proceedings B of the 7th International Multiconference—Language Technologies, Ljubljana, Slovenia, Oct. 2004.

Robert C. Miller et al. "Lightweight Structured Text Processing", Proceedings of 1999 USENIX Annual Technical Conference, Monterey, CA, Jun. 1999.

(Continued)

*Primary Examiner* — John Breene
*Assistant Examiner* — Mark E Hershley

(57) ABSTRACT

A resource string associated with output text is identified. A regular expression pattern is generated from the resource string. The regular expression pattern is matched to the output text. A verification result based on the matching of the regular expression pattern to the output text is provided.

20 Claims, 11 Drawing Sheets

OTHER PUBLICATIONS

Yanbo J. Wang et al. "Text Classification using Language-independent Pre-processing", In: M. Bramer, F. Coenen, A. Tuson (Eds): Research and Development in Intelligent Systems XXIII—Proceedings of the Twenty-sixth SGAI International Conference on Innovative Techniques and Applications of Artificial Intelligence, Peterhouse College, Cambridge, UK, Dec. 2006.

* cited by examiner

BACKUP COMMAND AND
OUTPUT TEXT IN ENGLISH

FIG. 1

102 {
D:\users>wbadmin get versions
wbadmin 1.0 – Backup command-line tool
(C) Copyright 2004 Microsoft Corp.

104 {
Backup time: 4/30/2006 6:38 AM
Backup target: Fixed Disk labeled BackupVolume(H:)
Version identifier: 04/30/2006-13:38

Backup time: 4/30/2006 7:17 AM ← 108
Backup target: Network Share labeled \\sudlh12\share\WindowsImageBackup|sudlh12
Version identifier: 04/30/2006-14:17

BACKUP COMMAND AND
OUTPUT TEXT IN GERMAN

202 {
```
D:\Users>wbadmin get versions
wbadmin 1.0 - Sicherungs-Befehlszeilentool
(C) Copyright 2004 Microsoft Corp.
```

204 {
```
Uhrzeit der Sicherung: 03.05.2006 01:10
Sicherungsziel: Eingebauter Datenträger mit der Bezeichnung "BackupVolume(G:)"
Versions-ID: 05/03/2006-08:10

Uhrzeit der Sicherung: 03.05.2006 07:33
Sicherungsziel: Eingebauter Datenträger mit der Bezeichnung "BackupVolume(G:)"
Versions-ID: 05/03/2006-14:33
```

INSTANCE WHERE POSITION OF
VARIABLE CHANGES WHEN
LOCALIZED

INSTANCE WHERE NUMBER OF
TOKENS COMPRISING A VARIABLE
CHANGES WHEN LOCALIZED

INSTANCE WHERE ORDER OF
VARIABLES IN TEXT CHANGES
WHEN LOCALIZED

AMBIGUOUS STATIC TEXT
AND VARIABLE

Output: /-802

Backup time: *4/30/2006 6:38 AM*
Backup target: *Fixed Disk labeled BackupVolume(H:)*
Version identifier: *04/30/2006-13:38*

Resource string corresponding to above output text /-804

Backup time: {0}
Backup target: {1}
Version identifier: {2}

Output:
Backup time: *4/30/2006 6:38 AM*
Backup target: *Fixed Disk labeled BackupVolume(H:)*
Version identifier: *04/30/2006-13:38*

Regular expression pattern with which above output is matched
Backup time: (<?capture0>.+)\nBackup target: (<?capture1>.+)\nVersion identifier: (<?capture2>.+)\n

1102 capture0 = *4/30/2006 6:38 AM*
capture1 = *Fixed Disk labeled BackupVolume(H:)*
capture2 = *04/30/2006-13:38*

RESULTS OF PATTERN MATCH

FIG. 11

LANGUAGE NEUTRAL TEXT VERIFICATION

BACKGROUND

In many situations, textual data needs to be verified and elements of interest within the text need to be extracted. Some common examples include verifying the output generated by an application and picking out variables that need to be validated in areas like software testing, analyzing a log file generated by an application, extracting diagnostic information for identifying reasons for failures in Product Support Services, and extracting information from the output of an application while developing scripts for administrative Information Technology (IT) tasks.

Existing mechanisms for text verification are inadequate. First, text is localized into many languages. Any verification code that depends on the specific text needs to be changed/re-implemented for each language, making it costly. Such verification code also scales poorly as the number of languages text is localized to increases. Second, the stability of such verification code is low because there can be ambiguity in where the elements of interest start and end in the text. In such situations, the verification code will fail.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Embodiments of the invention provide language neutral text verification. A regular expression pattern is dynamically created from the resource string corresponding to the text to be verified. The text to be verified is matched with the generated regular expression. The pattern match accomplishes text verification and information extraction together. In one example, embodiments of the invention may be used in software testing.

Many of the attendant features will be more readily appreciated as the same become better understood by reference to the following detailed description considered in connection with the accompanying drawings.

BRIEF DESCRIPTION OF THE DRAWINGS

Like reference numerals are used to designate like parts in the accompanying drawings.

FIG. 1 shows example output text in accordance with an embodiment of the invention.

FIG. 2 shows example output text in accordance with an embodiment of the invention.

FIG. 8 shows example output text and a corresponding resource string in accordance with an embodiment of the invention.

FIG. 10 shows output text and a regular expression for verifying the output text in accordance with an embodiment of the invention.

FIG. 11 shows verification results in accordance with an embodiment of the invention.

DETAILED DESCRIPTION

Figure 3:
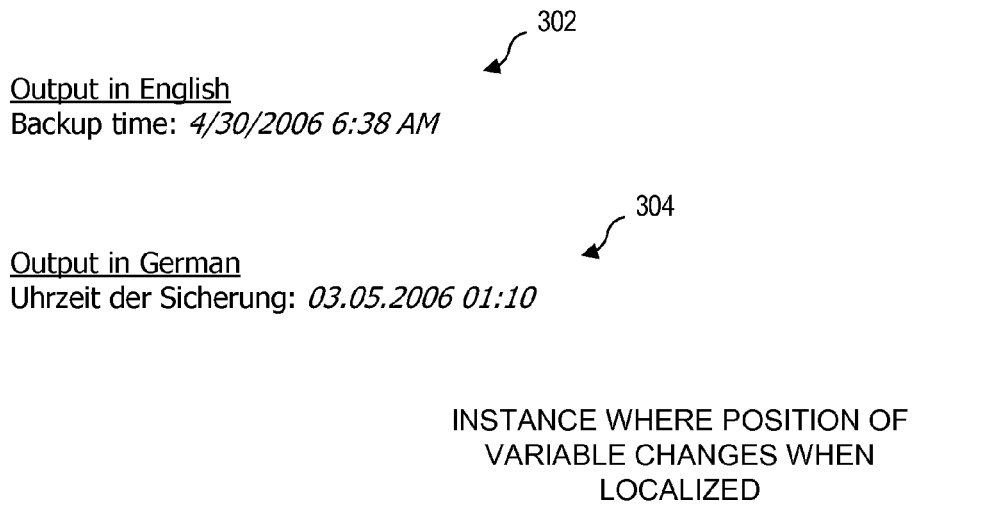
FIG. 3 shows example output text in accordance with an embodiment of the invention.

The detailed description provided below in connection with the appended drawings is intended as a description of the present examples and is not intended to represent the only forms in which the present examples may be constructed or utilized. The description sets forth the functions of the examples and the sequence of steps for constructing and operating the examples. However, the same or equivalent functions and sequences may be accomplished by different examples.

Embodiments of the invention utilize resource strings and regular expression based pattern matching for text verification and information extraction. In short, the problem of text verification and information extraction is reduced to one of pattern matching. From a resource string, a regular expression pattern is dynamically generated. The text to be verified is matched with this regular expression pattern. The pattern match accomplishes text verification and information extraction together.

The term "text" refers to characters (e.g., letter, number, punctuation mark, etc.) and/or symbols that represent human speech. "Text" is often manipulated by computing devices using strings. A string includes a data structure composed of a sequence of characters usually representing human-readable text.

Embodiments of language neutral text verification as described herein provide numerous advantages. First, is language neutrality; an implementation based on this approach will work irrespective of what language the text is localized into. Deriving the pattern from resource strings makes the solution language neutral. As text changes with localization, the resource string also changes, but the verification code itself remains unchanged.

Embodiments herein scale well when text is localized into more and more languages. Since the generation of the regular expression pattern is dynamic, no changes to verification code are required. It automatically works on new languages. Also, language neutral text verification is robust; pattern matching with regular expressions handles ambiguous situations well.

Further, embodiments herein are efficient; regular expression pattern matching tools are highly optimized for text processing. Embodiments herein are also simple to implement. Text verification code based on techniques described herein is simpler to implement because it uses pattern matching tools to perform complex text comparisons and searches. The text verification code itself is very light-weight.

Embodiments of the invention are described below in the context of software testing. The software testing examples presented below involve verifying output text generated by a command line application and extraction of information from the output text. However, one skilled in the art having the benefit of this description will appreciate that embodiments of the invention may be used in other situations involving text verification.

Consider the command line application and its output text shown in FIG. 1. In FIG. 1, the Command Line Interface (CLI) for backup application "wbadmin" is shown at 102. The output text is shown at 104.

The output text 104 includes two parts: static text and variables. As used herein, static text includes text that comes straight from the resource string and is constant for a human language. It does not vary with application state or environmental factors for a given language. The non-italicized text (e.g., "Version identifier:" shown at 106) represents static text. This text may be verified for equivalence character by character.

As used herein, a variable includes data generated at runtime by the application and varies from installation to installation, time to time, depending on state information and environment. In FIG. 1, all the italicized text (e.g., "4/30/2006 7:17 AM" shown at 108) are variables. A verification test may extract and use the variables for other further verifications. For example, follow-on tests may include restoring data from the backup taken at the variable "4/30/2006 7:17 AM" shown at 108.

The following discusses existing approaches for text verification and their shortcomings in different circumstances. Approaches for verifying static text and extracting variable information from text are examined.

Verifying static text involves ensuring that static text is correct. For example, verifying that the command's output should read "wbadmin 1.0—Backup command-line tool" (shown at 102) instead of something else like "aslkdfaldskf". Some of the existing techniques accomplish this by looking for some expected string in the text. For example, static text like "Backup Identifier" may be tied to the verification code, and the code would search for this string in the output. The problem with this approach is that it will not work across all languages that the application might be localized to. Referring to FIG. 2, the output text 204 is outputted in the German language from German CLI 202. Clearly, a static text verification of looking for "Backup Identifier" it will definitely not work for German output text 204. There is no "Backup Identifier" string in German output text 204.

Extracting variable information in text involves extracting variables, such as the Backup time 108, from the output of the application. Existing techniques may accomplish this in several ways: pick characters based on position within the text (e.g., pick n characters starting at position m), tokenize the output based on some separator (e.g., a space) and pick out the $n^{th}$ token, or pick characters based on relative position (e.g., pick all characters after "the" and before "\n").

Figure 4:
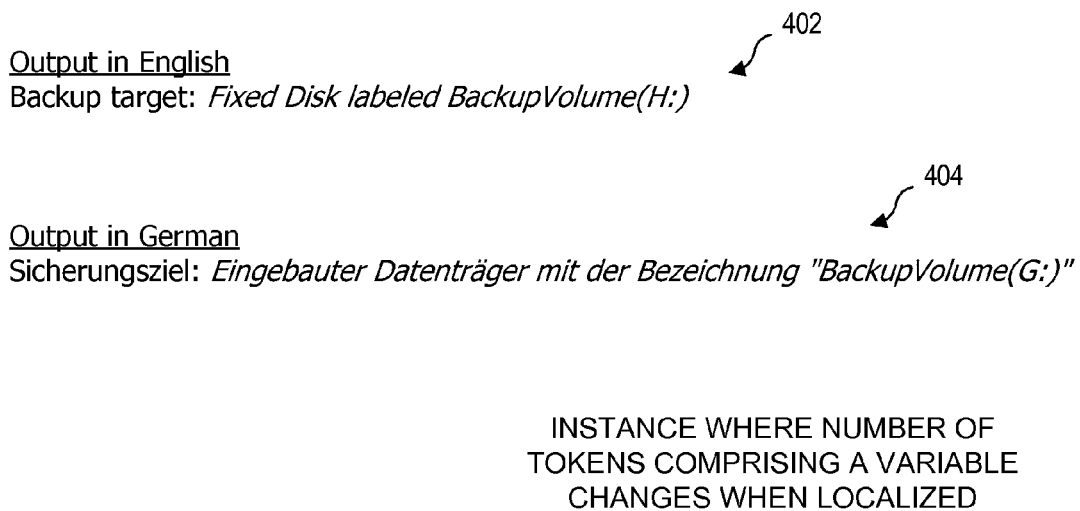
FIG. 4 shows example output text in accordance with an embodiment of the invention.

There are several problems associated with these approaches. For example, if text is localized to a different language, the position of the variable changes. In the backup application output in FIG. 3, Backup time starts at the $13^{th}$ character in English (shown at 302), while Backup time starts at $20^{th}$ character in German (shown at 304). Verification relying on position of variables will not work correctly in this case.

Where information extraction involves tokenizing text based on separators, the variable itself might have the separator character. In such cases, the variable will span many tokens. For example, in FIG. 4, Backup target comprises 4 tokens in English (shown at 402), while the backup target in German comprises 6 tokens (shown at 404). Verification relying on tokenizing text will fail in such a case.

Figure 5:
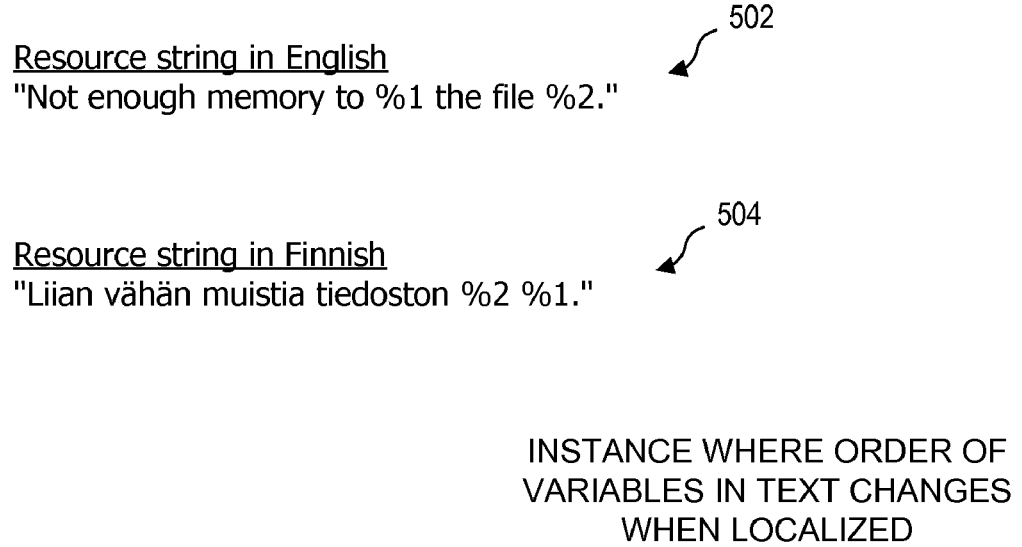
FIG. 5 shows example resource strings in accordance with an embodiment of the invention.

In another case, the order in which variables appear in the output may vary from language to language. FIG. 5 shows a resource string having variables "% 1" and "% 2". The output text is displayed when some operation (variable "% 1") could not be performed on a file (variable "% 2"). In the English version of the resource string (shown at 502), the operation comes first, followed by the file. In the Finnish version (shown at 504), the file comes first, followed by the operation.

Figure 6:
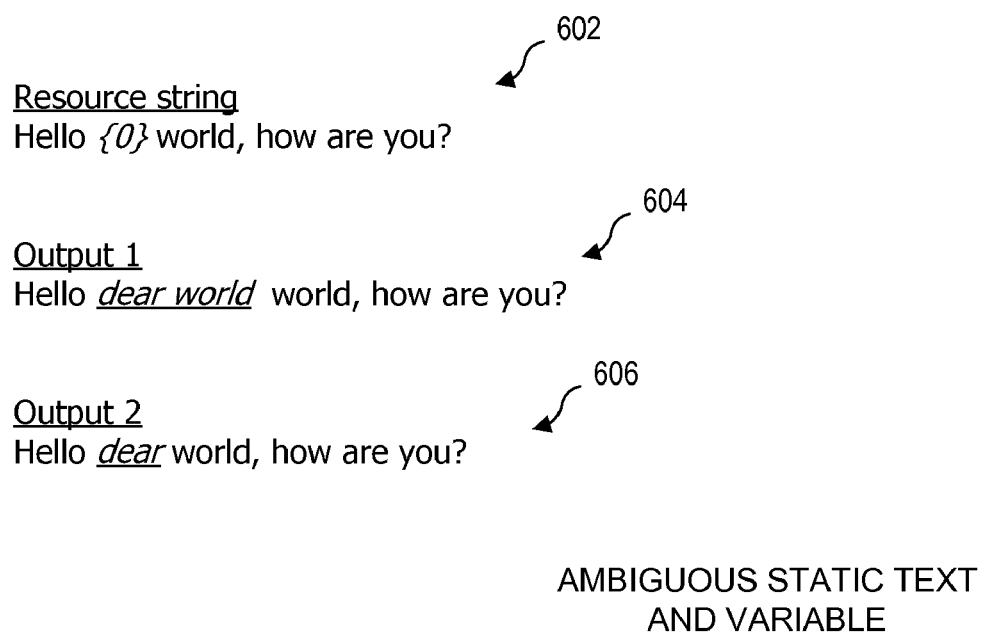
FIG. 6 shows example output text and a corresponding resource string in accordance with an embodiment of the invention.

In another case, there is a possibility of ambiguity where the variable ends and static text begins. In FIG. 6, resource string 602 shows the static text with the placeholder {0} for the variable. In output 1 (shown at 604), "world" following "dear" is part of the variable. In output 2 (shown at 606), "world" following "dear" is part of static text. Thus, there is ambiguity here. Approaches that extract variables based on their relative position, such as extracting text between "Hello" and "world", will fail in such cases.

Figure 7:
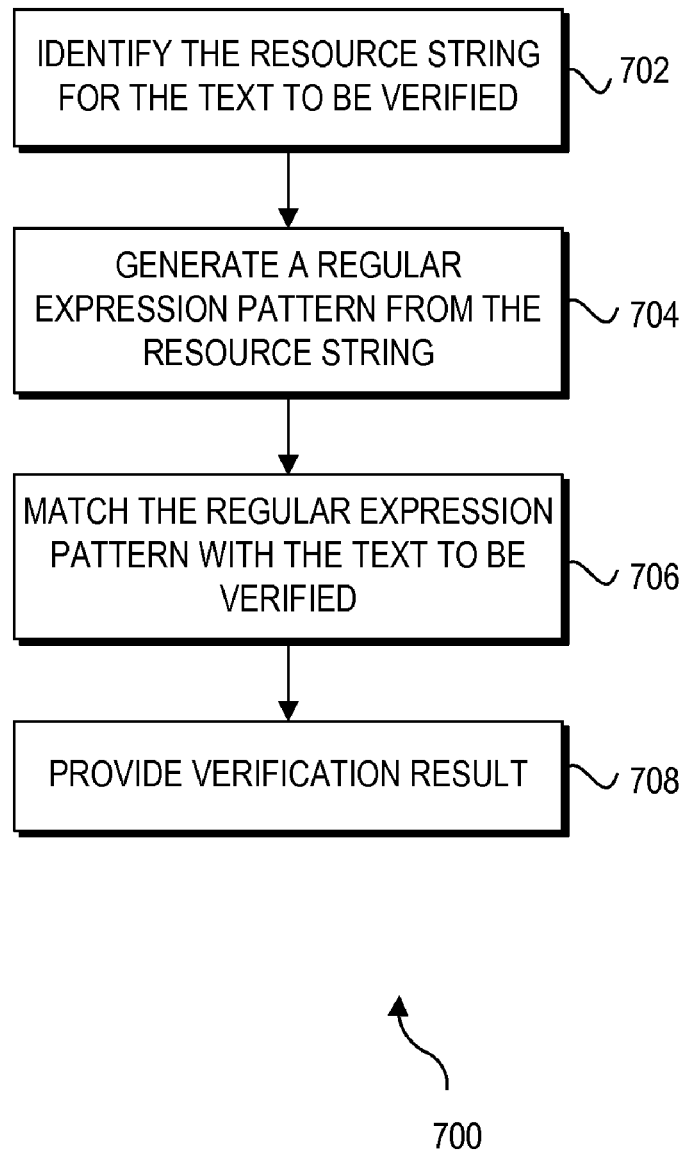
FIG. 7 is a flowchart showing the logic and operations of language neutral text verification in accordance with an embodiment of the invention.

Turning to FIG. 7, a flowchart 700 shows the logic and operations of language neutral text verification in accordance with an embodiment of the invention. In one embodiment, at least a portion of the logic of flowchart 700 may be implemented as computer readable instructions. Embodiments of a computing device to execute such computer readable instructions are discussed below in conjunction with FIG. 13.

Starting in block 702, the resource string(s) that comprise the text to be verified are identified. In most modern applications, output text is generated from resource strings. Examples of textual output include textual output printed at a console, text visible on a Graphical User Interface, text written in log files for diagnosis, and the like. For a given application, it is possible to find which resource strings are being used to generate the text. For example, in an application developed using Microsoft Visual Studio®, resource strings may be found in the application's resource file. Resource strings may also be found in a compiled resource file, also called a Resource Dynamic-Link Library (DLL) or a resource assembly, installed with the application that can be examined using a binary resource editor. Referring to FIG. 8, a resource string 804 is shown for generating output text 802. In an embodiment discussed below in FIG. 12, the output text and the corresponding resource string are passed as an input to a language neutral text verification application.

Proceeding to block 704, a regular expression pattern is generated from the resource string(s). In one embodiment, the regular expression pattern is generated from the resource string by replacing format specifiers in the resource string with named captures. Format specifiers are placeholders in resource strings that would be replaced by variables at run time by the application. When the actual pattern matching happens in block 706, the variables will get captured in the named captures of the regular expression.

Figure 9:
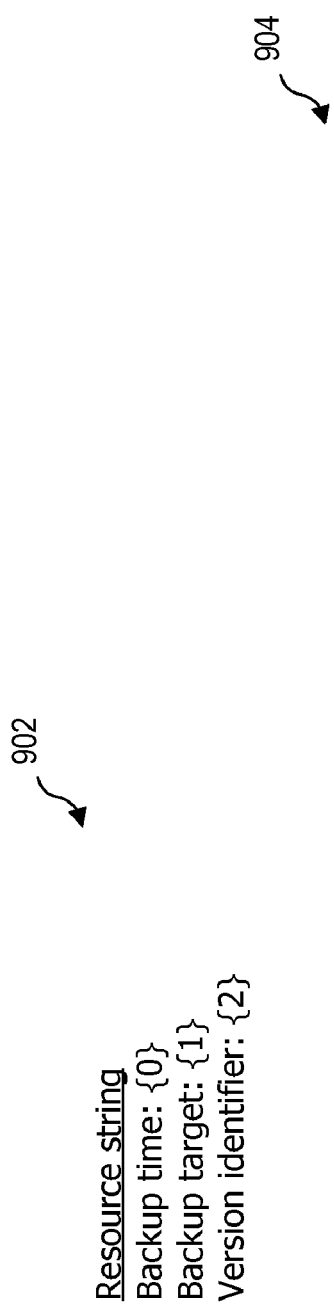
FIG. 9 shows a resource string and a regular expression generated from the resource string in accordance with an embodiment of the invention.

Referring to FIG. 9, for resource string 902, the regular expression pattern 904 generated after replacing format specifiers with regular expressions is shown. Resource string 902 includes static text "Backup time:" followed by a variable (shown by placeholder {1}), static text "Backup target:" followed by a variable (shown by placeholder {1}), and static text "Version identifier:" followed by a variable (shown by placeholder {2}). In generated regular expression pattern 904, the symbol ".+" causes one or more characters to be captured at the named capture (such as "capture0"). The symbol "\n" caused the regular expression to refer to a new line.

It will be appreciated that the regular expression pattern is generated dynamically from the resource string. This enables the regular expression pattern to take into account variations from different languages after an application has been localized to a particular country or region. Also, ambiguities between static text and variables are easily resolved when the regular expression pattern is built from the application's localized resource strings.

Generating the language neutral verification pattern from the resource string may involve various complexities. Cases where the resource string contains some special characters that can affect the pattern match and cases where the variables span multiple lines are some of the issues that need to be considered when generating the regular expression pattern. Consider the case where the resource string contains some special characters. In most regular expression parsers, certain characters have special significance. For example, in the Microsoft® .NET Framework regular expression parser, the character $ (dollar) is considered as an end-of-line marker. Now consider a resource string "Pay me $% 1". Consider the output text "Pay me $100". This output text is generated from the resource string, and the language neutral text verification algorithm must succeed in matching the output, and extracting the variable 100. However, the .NET Framework regular expression parser considers the $ character as an end-of-line marker. Because of this, the pattern matching fails because "Pay me" is not at the end of line. To avoid this, the algorithm makes use of the escape character \ (back-slash) to remove the special meaning of $ (dollar). In the example resource string, the dollar is preceded by a back-slash, like "Pay me \$% 1". Now the regular expression parser performs the match correctly. In the case where a variable can span multiple lines, a symbol "(.|\n)+" can be used instead of ".+" because the .NET Framework regular expression parser does not allow a "." (dot) character to match a newline.

Continuing to block 706, the regular expression pattern is matched with the output text. The pattern matching algorithm uses a regular expression based pattern matching tool and matches the text with the generated regular expression pattern. Also, if the regular expression pattern includes any named captures, values for variables are captured in the named captures. For example, in FIG. 10, output text 1002 which needs to be verified is matched against generated regular expression pattern 1004. Example pattern matching tools that may be used include, but are not limited to, the Microsoft® .NET Regular Expression class library or the Perl interpreter.

Next, in block 708, the verification results are provided. The verification results may be stored, such as on a local or network storage, or the results may be sent to an output device, such as a printer or a display monitor.

In one embodiment, if the match succeeds (i.e., passes), it means: output is a valid instance of the resource string (i.e., the logic of flowchart 700 has verified that output has been generated from the resource string by the application), the static text in the output matches the resource string verbatim, and the variables have been extracted from the output. In short, if the match succeeds, the verification has passed, output is validated and variable information has been extracted. For example, in FIG. 11, pattern matching will evaluate to true and the captures (as shown at 1102) have been completed. In FIG. 11, captured variable data is shown for "capture0", "capture1", and "capture2". If the pattern match fails, it means the output text is not as expected. The pattern match may fail when the text to be verified is not a valid instance of the resource string or static text in the text to be verified does not match the resource string. Thus, the text verification fails.

Figure 12:
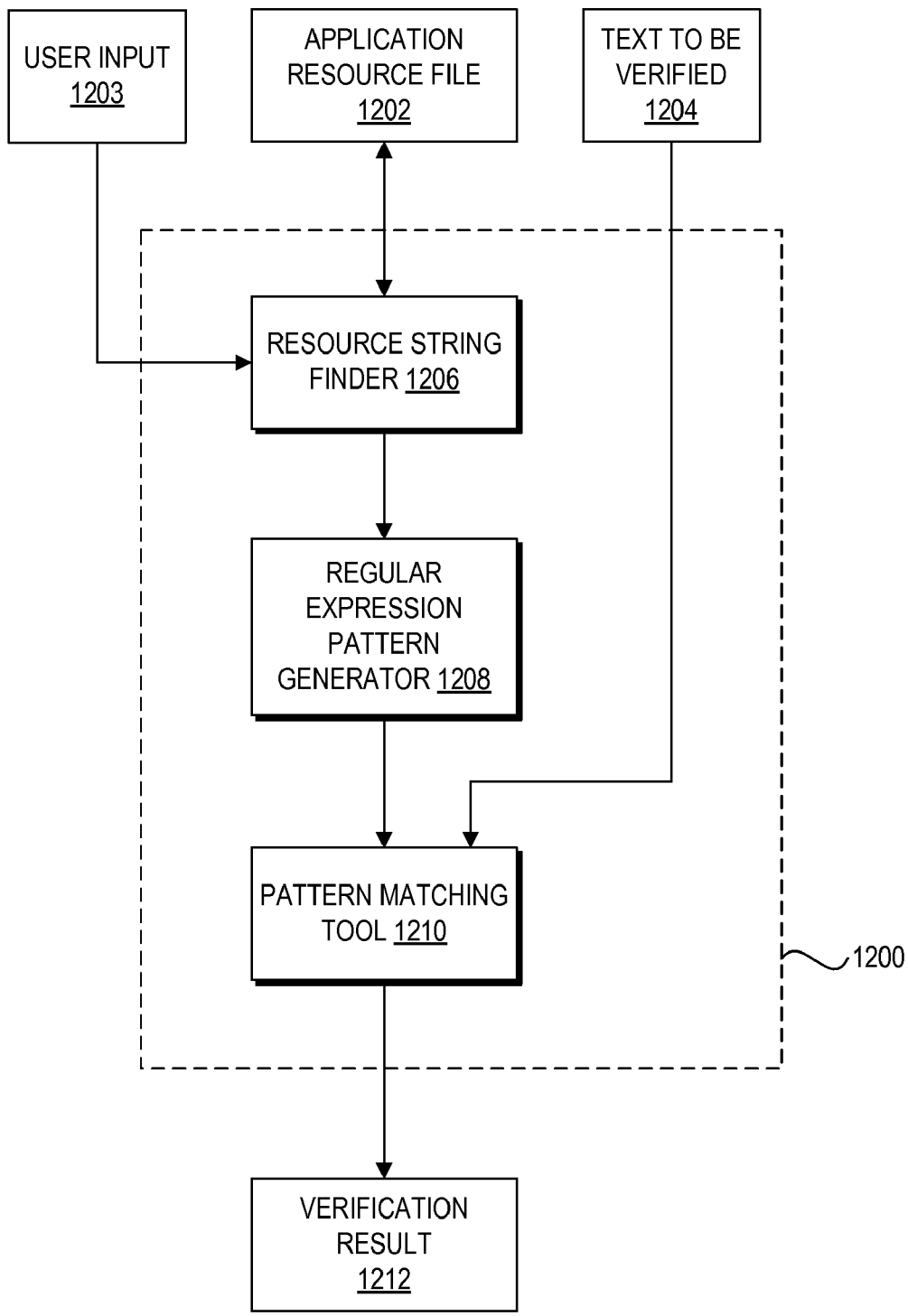
FIG. 12 is a block diagram of a language neutral text verification application in accordance with an embodiment of the invention.

Turning to FIG. 12, an embodiment of a language neutral text verification application 1200 is shown. Components of application 1200 may implemented as one or more computer readable modules executable by a computing device.

Language neutral text verification application 1200 includes a resource string finder 1206, a regular expression pattern generator 1208, and a pattern matching tool 1210. Resource string finder 1206 finds the resource string(s) that are used to generate text 1204. Text 1204 is the text to be verified. In the embodiment of FIG. 12, resource string finder 1206 access the application resource file 1202 of the application that produced text 1204. Application resource file 1202 may include a compiled resource file. Resource string finder 1206 extracts the relevant resource string(s) and passes them to regular expression pattern generator 1208.

In one embodiment, resource string finder 1206 receives user input 1203 to use in finding the resource string(s). In one example, user input 1203 may include a resource string identification (ID) for the resource string of interest. Resource string finder 1206 may then use the resource string ID to read the resource string from application resource file 1202. In another embodiment, user input 1203 includes at least a portion of the text from the text to be verified 1204. Resource string finder 1206 uses the provided text to iterate through the resource strings in application resource file 1202 to find the matching resource string(s).

Regular expression pattern generator 1208 takes the resource string(s) and outputs the regular expression pattern to be used for verification. Pattern matching tool 1210 compares text 1204 and the generated pattern received from regular expression pattern generator 1208. Pattern matching tool 1210 outputs the verification result 1212.

Embodiments herein provide language neutral text verification using resource strings and regular expressions. Generating a language neutral text verification pattern dynamically from the resource string provides language neutrality. As text changes with localization, the resource string changes, but the verification code itself remains unchanged. The use of pattern matching provides robustness, efficiency and simplicity to the verification process. All the text processing, such as comparisons, extracting information, dealing with ambiguous situations, is handled by a pattern matching tool. The verification code implementation becomes simple but is still efficient and robust by virtue of using pattern matching.

Figure 13:
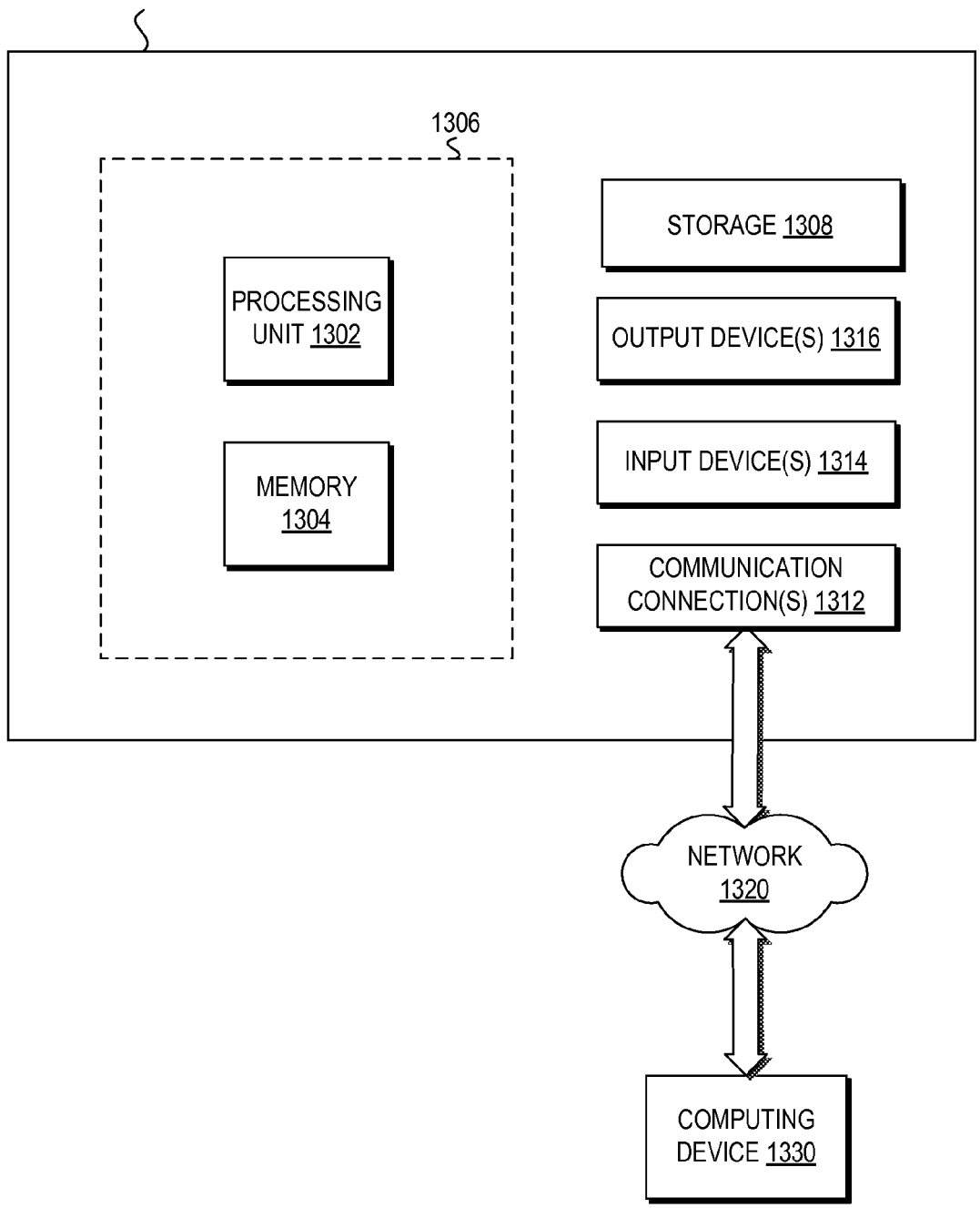
FIG. 13 is a block diagram of an example computing device for implementing embodiments of the invention.

FIG. 13 and the following discussion are intended to provide a brief, general description of a suitable computing environment to implement embodiments of the invention. The operating environment of FIG. 13 is only one example of a suitable operating environment and is not intended to suggest any limitation as to the scope of use or functionality of the operating environment. Other well known computing devices, environments, and/or configurations that may be suitable for use with embodiments described herein include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments of the invention are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 13 shows an example of a computing device 1300 for implementing one or more embodiments of the invention. In one configuration, computing device 1300 includes at least one processing unit 1302 and memory 1304. Depending on the exact configuration and type of computing device, memory 1304 may be volatile (such as RAM), non-volatile (such as ROM, flash memory, etc.) or some combination of the two. This configuration is illustrated in FIG. 13 by dashed line 1306.

In other embodiments, device 1300 may include additional features and/or functionality. For example, device 1300 may also include additional storage (e.g., removable and/or non-removable) including, but not limited to, magnetic storage, optical storage, and the like. Such additional storage is illustrated in FIG. 13 by storage 1308. In one embodiment, computer readable instructions to implement embodiments of the invention may be in storage 1308. Storage 1308 may also store other computer readable instructions to implement an operating system, an application program, and the like.

The term "computer readable media" as used herein includes computer storage media. Computer storage media includes volatile and nonvolatile, removable and non-removable media implemented in any method or technology for storage of information such as computer readable instructions or other data. Memory 1304 and storage 1308 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1300. Any such computer storage media may be part of device 1300.

Device 1300 may also include communication connection(s) 1312 that allow device 1300 to communicate with other devices. Communication connection(s) 1312 may include, but is not limited to, a modem, a Network Interface Card (NIC), an integrated network interface, a radio frequency transmitter/receiver, an infrared port, a USB connection, or other interfaces for connecting computing device 1300 to other computing devices. Communication connection(s) 1312 may include a wired connection or a wireless connection. Communication connection(s) 1312 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, Near Field Communication (NFC), and other wireless media.

Device 1300 may include input device(s) 1314 such as keyboard, mouse, pen, voice input device, touch input device, infrared cameras, video input devices, and/or any other input device. Output device(s) 1316 such as one or more displays, speakers, printers, and/or any other output device may also be included in device 1300. Input device(s) 1314 and output device(s) 1316 may be connected to device 1300 via a wired connection, wireless connection, or any combination thereof. In one embodiment, an input device or an output device from another computing device may be used as input device(s) 1314 or output device(s) 1316 for computing device 1300.

Components of computing device 1300 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 1300 may be interconnected by a network. For example, memory 1304 may be comprised of multiple physical memory units located in different physical locations interconnected by a network.

In the description and claims, the term "coupled" and its derivatives may be used. "Coupled" may mean that two or more elements are in contact (physically, electrically, magnetically, optically, etc.). "Coupled" may also mean two or more elements are not in contact with each other, but still cooperate or interact with each other (for example, communicatively coupled).

Those skilled in the art will realize that storage devices utilized to store computer readable instructions may be distributed across a network. For example, a computing device 1330 accessible via network 1320 may store computer readable instructions to implement one or more embodiments of the invention. Computing device 1300 may access computing device 1330 and download a part or all of the computer readable instructions for execution. Alternatively, computing device 1300 may download pieces of the computer readable instructions, as needed, or some instructions may be executed at computing device 1300 and some at computing device 1330. Those skilled in the art will also realize that all or a portion of the computer readable instructions may be carried out by a dedicated circuit, such as a Digital Signal Processor (DSP), programmable logic array, and the like.

Various operations of embodiments of the present invention are described herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment of the invention.

The above description of embodiments of the invention, including what is described in the Abstract, is not intended to be exhaustive or to limit the embodiments to the precise forms disclosed. While specific embodiments and examples of the invention are described herein for illustrative purposes, various equivalent modifications are possible, as those skilled in the relevant art will recognize in light of the above detailed description. The terms used in the following claims should not be construed to limit the invention to the specific embodiments disclosed in the specification. Rather, the following claims are to be construed in accordance with established doctrines of claim interpretation.

What is claimed is:

1. A method comprising:
    receiving output text that is output by an application, the application being associated with a plurality of resource strings;
    iterating through the plurality of resource strings to identify a matching resource string that matches the output text, the matching resource string comprising:
        static text that is directly output by the application; and
        placeholders that are replaced by the application at runtime with variables, the variables being output by the application with the static text;
    generating a regular expression pattern from the matching resource string, the regular expression pattern including a portion for the static text and a portion for the variables;
    matching the regular expression pattern to the output text produced by the application;
    indicating that the regular expression pattern and the output text match when the output text is a valid instance of the resource string and static text in the output text matches the static text of the resource string; and
    indicating that the regular expression pattern and the output text do not match when at least one of: the output text is not a valid instance of the resource string or static text in the output text does not match the static text of the resource string.

2. The method of claim 1 wherein matching the regular expression pattern includes extracting information from the output text.

3. The method of claim 1 wherein generating the regular expression pattern includes replacing a format specifier in the matching resource string with a named capture.

4. The method of claim 3 wherein matching the regular expression pattern includes capturing an individual variable in the named capture.

5. One or more computer-readable storage media storing computer readable instructions that, when executed by one or more processing units, cause the one or more processing units to perform:
    receiving output text that is output by an application, the application being associated with a plurality of resource strings;
    iterating through the plurality of resource strings to identify a matching resource string that matches the output text, the matching resource string comprising:
        static text that is directly output by the application; and
        placeholders that are replaced by the application at runtime with variables, the variables being output by the application with the static text;
    generating a regular expression pattern from the matching resource string, the regular expression pattern including a portion for the static text and a portion for the variables;
    matching the regular expression pattern to the output text produced by the application;
    indicating that the regular expression pattern and the output text match when the output text is a valid instance of the resource string and static text in the output text matches the static text of the resource string; and
    indicating that the regular expression pattern and the output text do not match when at least one of: the output text is not a valid instance of the resource string or static text in the output text does not match the static text of the resource string.

6. The computer-readable storage media according to claim 5, wherein the matching resource string does not include a regular expression.

7. The computer-readable storage media according to claim 5, wherein the plurality of resource strings include resource strings in different languages.

8. The computer-readable storage media according to claim 7, wherein the matching resource string is in a first individual language, and iterating through the plurality of resource strings comprises iterating through one or more non-matching resource strings that are not in the first individual language.

9. The computer-readable storage media according to claim 5, wherein the plurality of resource strings are included in a compiled resource file that is associated with the application.

10. The computer-readable storage media according to claim 5, further storing computer readable instructions that, when executed by the one or more processing units, cause the one or more processing units to perform:
    receiving a portion of the output text from a user, the portion being used to identify the matching resource string.

11. The computer-readable storage media according to claim 5, wherein the application prints the output text at a console.

12. The computer-readable storage media according to claim 5, wherein the application provides the output text on a graphical user interface.

13. The computer-readable storage media according to claim 5, wherein the application writes the output text to a log file.

14. A system comprising:
    a resource string finder configured to:
        receive output text that is output by an application, the application being associated with a plurality of resource strings;
        iterate through the plurality of resource strings to identify a matching resource string that matches the output text, the matching resource string comprising:
            static text that is directly output by the application; and
            placeholders that are replaced by the application at runtime with variables, the variables being output by the application with the static text;
    a regular expression pattern generator configured to generate a regular expression pattern from the matching resource string, the regular expression pattern including a portion for the static text and a portion for the variables;
    a pattern matching tool configured to:
        match the regular expression pattern to the output text produced by the application;
        indicate that the regular expression pattern and the output text match when the output text is a valid instance of the resource string and static text in the output text matches the static text of the resource string; and
        indicate that the regular expression pattern and the output text do not match when at least one of: the output text is not a valid instance of the resource string or static text in the output text does not match the static text of the resource string; and
    at least one processing device configured to execute one or more of the resource string finder, the regular expression pattern generator, or the pattern matching tool.

15. The system according to claim 14, wherein the matching resource string does not include a regular expression.

16. The system according to claim 14, wherein the plurality of resource strings include resource strings in different languages.

17. The system according to claim 16, wherein the matching resource string is in a first individual language, and the resource string finder is configured to iterate through one or more non-matching resource strings that are not in the first individual language.

18. The system according to claim 14, wherein the plurality of resource strings are included in a compiled resource file that is associated with the application.

19. The system according to claim 14, wherein the resource string finder is further configured to receive a portion of the output text from a user, the portion being used to identify the matching resource string.

20. The system according to claim 14, wherein the application prints the output text at a console, provides the output text on a graphical user interface, or writes the output text to a log file.

* * * * *